United States Patent
Thomas et al.

(10) Patent No.: US 11,382,262 B2
(45) Date of Patent: Jul. 12, 2022

(54) INFEED HEAD FLEX TO RIGID MODE LOCK OUT MECHANISM

(71) Applicant: CNH Industrial America LLC, New Holland, PA (US)

(72) Inventors: Jeff Thomas, Gordonville, PA (US); Blaine R. Noll, Fleetwood, PA (US); Benjamin Kemmerer, Hamburg, PA (US); Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 226 days.

(21) Appl. No.: 16/740,985

(22) Filed: Jan. 13, 2020

(65) Prior Publication Data

US 2021/0212254 A1 Jul. 15, 2021

(51) Int. Cl.
| | |
|---|---|
| *A01D 34/28* | (2006.01) |
| *A01D 41/14* | (2006.01) |
| *A01D 34/04* | (2006.01) |
| *A01B 73/00* | (2006.01) |

(52) U.S. Cl.
CPC ............ *A01D 34/283* (2013.01); *A01B 73/00* (2013.01); *A01D 34/04* (2013.01); *A01D 34/28* (2013.01); *A01D 41/145* (2013.01); *A01D 41/14* (2013.01)

(58) Field of Classification Search
CPC .... A01B 73/00; A01B 63/008; A01D 41/145; A01D 34/283; A01D 34/26; A01D 34/243; A01D 34/286; A01D 34/24; A01D 34/28
See application file for complete search history.

(56) References Cited

U.S. PATENT DOCUMENTS

| | | | |
|---|---|---|---|
| 2,608,042 A | 8/1952 | Paul | |
| 3,176,452 A | 4/1965 | Wathen et al. | |
| 3,654,749 A | 4/1972 | Ostergren et al. | |
| 4,227,363 A * | 10/1980 | Kerber | A01D 41/145 56/10.2 E |
| 7,805,921 B2 * | 10/2010 | Coers | A01D 41/141 56/364 |
| 8,601,779 B1 * | 12/2013 | Figgins | A01D 34/283 56/181 |
| 9,452,512 B2 * | 9/2016 | Joyce | B25B 13/48 |
| 10,959,374 B2 * | 3/2021 | Duerksen | A01D 57/20 |
| 2007/0193243 A1 * | 8/2007 | Schmidt | A01D 57/20 56/181 |
| 2007/0204585 A1 * | 9/2007 | Lovett | A01D 61/002 56/15.8 |

(Continued)

FOREIGN PATENT DOCUMENTS

| | | | |
|---|---|---|---|
| JP | 2010246410 A | 11/2010 | |
| WO | WO-2019055521 A1 * | 3/2019 | ........... A01D 34/283 |

*Primary Examiner* — Adam J Behrens
(74) *Attorney, Agent, or Firm* — Peter Zacharias; Patrick Sheldrake

(57) ABSTRACT

A header for an agricultural harvester having a cutterbar lockout control mechanism that can be set in flex or rigid modes independent of the position of the cutterbar assembly. The cutterbar lockout control mechanism may be set to flex or rigid modes without the operator having to reach under the header, and the operator may reposition the cutterbar assembly without leaving the cab. Also, a method for setting the operating mode of a cutterbar assembly of a header for an agricultural harvester, and a method for repositioning a cutterbar assembly of a header for an agricultural harvester.

17 Claims, 12 Drawing Sheets

(56) References Cited

U.S. PATENT DOCUMENTS

| | | | | |
|---|---|---|---|---|
| 2008/0078155 A1* | 4/2008 | Coers | ............... | A01D 41/141 56/15.8 |
| 2008/0276590 A1* | 11/2008 | Sauerwein | ............ | A01D 41/14 56/153 |
| 2009/0293441 A1* | 12/2009 | Sauerwein | ............ | A01D 41/14 56/208 |
| 2010/0000191 A1* | 1/2010 | Ehrhart | ............... | A01D 75/28 56/10.2 E |
| 2015/0319920 A1* | 11/2015 | Joyce | ................. | B25B 13/48 56/158 |
| 2018/0228086 A1* | 8/2018 | Cook | ............... | A01D 41/141 |
| 2019/0029174 A1* | 1/2019 | Talbot | ............... | A01D 41/145 |
| 2019/0297775 A1* | 10/2019 | Fuechtling | ............ | A01D 34/14 |
| 2020/0337227 A1* | 10/2020 | Yanke | ............... | A01D 34/283 |
| 2021/0195833 A1* | 7/2021 | Hamilton | ............ | A01D 34/283 |

\* cited by examiner

INFEED HEAD FLEX TO RIGID MODE LOCK OUT MECHANISM

FIELD OF THE INVENTION

This application relates generally to headers for agricultural harvesters. In particular, this application relates to a header including a cutterbar lockout adjustment mechanism, a method of changing cutterbar operating modes using such mechanism, and a method for repositioning a cutterbar assembly using such mechanism.

BACKGROUND

Agricultural harvesters such as combine harvesters are well-known apparatuses for harvesting grain crops. An agricultural harvester is typically a self-propelled vehicle that includes a feeder house and mechanisms downstream of the feeder house for separating grain from other crop material. A header is attached to the front of the harvester and includes mechanisms for cutting crop, gathering crop, and delivering crop to the harvester's feeder house. A typical crop cutter or cutterbar includes a stationary knife and a reciprocating knife, which together act as shears that cut crop near the ground. After cutting, the crop is gathered, e.g., by a harvesting reel to an auger or draper belt, which feeds the cut crop to a conveyor system that transports the cut crop to the harvester's feeder house.

Certain header constructions include skid plates or skid shoes that extend the width of the header and which are operable to contact the ground surface as the combine travels over a field being harvested. The skid shoes are carried at the fore or distal ends of a plurality of independently movable and spaced apart flex or supporting arms, and the crop cutter or cutterbar is carried at the leading edge of the skid shoes. The supporting arms are pivotably attached at their aft or proximal ends to the header main frame or frame, and down-stop linkages limit downward movement of the supporting arms in relation to the header main frame. The down-stop linkages are typically pivotally connected at one end to the header main frame and slidably and/or pivotally connected at their opposite ends to the supporting arms. In such header designs, the down-stop linkages are employed to lock and unlock the supporting arms and thus the cutterbar at predetermined positions with respect to the header main frame. In the unlocked state, the supporting arms are able to pivot upwardly and downwardly as dictated by changes in ground contour experienced by the skid shoes. Consequently, the cutterbar floats near to the ground during harvesting, which is beneficial when harvesting low-lying crops including but not limited to soybeans.

In such header designs including down-stop linkages, it is often desirable or necessary to secure or lock the supporting arms and the cutterbar in an upward stationary position with respect to the header main frame in order to effectively harvest standing crops including but not limited to wheat and barley. It is also common to lock the supporting arms with respect to the header main frame to prevent bouncing of the cutterbar during transport of the header between fields or portions of fields to be harvested. In operation, the locking and unlocking of the supporting arms can occur multiple times in a season, if not multiple times a week, or even more frequently.

Locking and unlocking of conventional header supporting arms is a time-consuming, laborious, and potentially hazardous task. When locking the supporting arms, the combine operator or other worker must physically lift each of the supporting arms and secure the supporting arm to the header main frame by inserting a fastener such as a locking pin into cooperating apertures provided in the down-stop linkage and a corresponding header main frame member. Because of the interconnection of the supporting arms, the skid shoes and the cutterbar, lifting of one supporting arm will cause the adjacent arms to rise somewhat. Hence, the person lifting one supporting arm will also at least partially lift the supporting arms to the right and left of the supporting arm being lifted. Additionally, the accumulation of dirt and/or crop material can make the supporting arms more difficult to lift. As a result, the force required to lift a typical header supporting arm can be considerable and may be beyond the physical capabilities of ordinary persons. Accordingly, a worker who experiences difficulty with or is incapable of lifting a supporting arm and inserting the locking fastener may need to rely upon the assistance of another person. Furthermore, securing the supporting arms in locked position with the locking pin or other fastener frequently may require the operator to crawl beneath the head to lift and lock the support arm in an awkward position, further placing the operator at risk for accident or injury.

BRIEF SUMMARY

In accordance with an exemplary embodiment, the subject application provides a header for an agricultural harvester. The header includes a frame, a cutterbar assembly, a lockout linkage assembly, and a cutterbar lockout adjustment mechanism. The cutterbar assembly includes a flex arm and a cutterbar connected to the flex arm at a distal end of the flex arm. The cutterbar assembly is pivotably connected to the frame at a proximal end of the cutterbar assembly. The header further includes a lockout linkage assembly connecting the frame to the proximal end of the flex arm, wherein the lockout linkage assembly cooperates with the frame and cutterbar assembly to define a range of angular movement of the cutterbar assembly and a range of generally vertical movement of the cutterbar between a lowered position and a raised position. The cutterbar lockout adjustment mechanism has a flex mode, wherein the cutterbar assembly can move freely between the lowered and raised positions and a rigid mode, wherein the cutterbar assembly may be locked in the raised position. The cutterbar lockout adjustment mechanism can be set in flex mode or rigid mode independent of the position of the cutterbar assembly.

In an aspect of the exemplary embodiment, the lockout linkage assembly includes a link having a first end, a second end, and an elongated aperture adjacent the second end, wherein the first end is pivotally connected to one of the frame and the cutterbar assembly and the second end is slidably connected to the other of the frame and cutterbar assembly. In another aspect of the exemplary embodiment, the link is an elongated plate, and the elongated aperture is a slot adjacent the second end.

In another aspect of the exemplary embodiment, the cutterbar lockout adjustment mechanism is connected to a latch cam that is pivotably attached to the cutterbar assembly. The latch cam can engage a stop on the lockout linkage assembly to lock the cutterbar assembly in the raised position only with the cutterbar assembly in the raised position. The cutterbar lockout adjustment mechanism further comprises a handle extending toward the proximal side of the frame, wherein the handle can be set to position the cutterbar lockout adjustment mechanism into the flex or rigid mode. In another aspect of the exemplary embodiment, the handle is set by resiliently retaining a projection on the handle to a catch fixed to the frame. In another aspect of the exemplary embodiment, a linkage arm assembly attached to the frame connects the handle to the latch cam.

In accordance with another exemplary embodiment, the subject application provides a method of setting operating modes of a header for an agricultural harvester, the header comprising a frame, a cutterbar assembly, a lockout linkage assembly, and a cutterbar lockout adjustment mechanism. The cutterbar assembly comprises a flex arm and a cutterbar connected to the flex arm at a distal end of the flex arm. The method includes connecting the cutterbar assembly to the frame via a pivot at a proximal end of the cutterbar assembly, connecting a proximal end of the lockout linkage assembly to the frame and connecting a distal end of the lockout linkage assembly to the proximal end of the cutterbar assembly, wherein the lockout linkage assembly cooperates with the frame and cutterbar assembly to define a range of angular movement of the cutterbar assembly and a range of generally perpendicular movement of the cutterbar between a lowered position and a raised position, attaching the cutterbar lockout adjustment mechanism to the frame, wherein the cutterbar lockout adjustment mechanism comprises a handle extending toward the proximal side of the frame and the handle can be set to position the cutterbar lockout adjustment mechanism into the flex or rigid mode, connecting the cutterbar lockout adjustment mechanism to a latch cam pivotably attached to the cutterbar assembly, wherein the latch cam can engage a stop on the lockout linkage assembly to lock the cutterbar assembly in the raised position only with the cutterbar assembly in the raised position, and setting the cutterbar lockout adjustment mechanism to a flex mode wherein the cutterbar assembly moves freely between the lowered and raised positions or to a rigid mode wherein the cutterbar assembly may be locked in the raised position.

In an aspect of the exemplary embodiment, the lockout linkage assembly comprises a link having a first end, a second end, and an elongated aperture adjacent the second end, wherein the first end is pivotably connected to one of the frame and the cutterbar assembly and the second end is slidably connected to the other of the frame and the cutterbar assembly. In another aspect of the embodiment, the link comprises an elongated plate and the elongated aperture comprises a slot adjacent the second end. In a further aspect of the embodiment, a linkage arm assembly attached to the frame connects the handle to the latch cam. In a further aspect of the embodiment, the handle is set by resiliently retaining a projection on the handle to a catch fixed to the frame.

In accordance with another exemplary embodiment, the subject application provides a method for repositioning a cutterbar assembly of a header for an agricultural harvester, the header comprising a frame, a cutterbar assembly, a lockout linkage assembly, and a cutterbar lockout adjustment mechanism, the cutterbar assembly comprising a flex arm and a cutterbar connected to the flex arm at a distal end of the flex arm. The method includes connecting the cutterbar assembly to the frame via a pivot at a proximal end of the cutterbar assembly, connecting a proximal end of the lockout linkage assembly to the frame and connecting a distal end of the lockout linkage assembly to the proximal end of the cutterbar assembly, wherein the lockout linkage assembly cooperates with the frame and cutterbar assembly to define a range of angular movement of the cutterbar assembly and a range of generally perpendicular movement of the cutterbar between a lowered position and a raised position, attaching the cutterbar lockout adjustment mecha-nism to the frame, wherein the cutterbar lockout adjustment mechanism comprises a handle extending toward the proximal side of the frame and the handle can be set to position the cutterbar lockout adjustment mechanism into the flex or rigid mode, connecting the cutterbar lockout adjustment mechanism to a latch cam pivotably attached to the cutterbar assembly, wherein the latch cam can engage a stop on the lockout linkage assembly to lock the cutterbar assembly in the raised position only with the cutterbar assembly in the raised position, setting the cutterbar lockout adjustment mechanism to a rigid mode wherein the cutterbar assembly may be locked in the raised position, and moving the cutterbar assembly into the raised position, wherein the latch cam engages the stop to lock the cutterbar assembly in the raised position.

In an aspect of the exemplary embodiment, the lockout linkage assembly comprises a link having a first end, a second end, and an elongated aperture adjacent the second end, wherein the first end is pivotably connected to one of the frame and the cutterbar assembly and the second end is slidably connected to the other of the frame and the cutterbar assembly. In another aspect of the exemplary embodiment, the link comprises an elongated plate and the elongated aperture comprises a slot adjacent the second end. In another aspect of the exemplary embodiment, a linkage arm assembly attached to the frame connects the handle to the latch cam. In a further aspect of the exemplary embodiment, the handle is set by resiliently retaining a projection on the handle to a catch fixed to the frame.

BRIEF DESCRIPTION OF THE SEVERAL
VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

Figure 11:
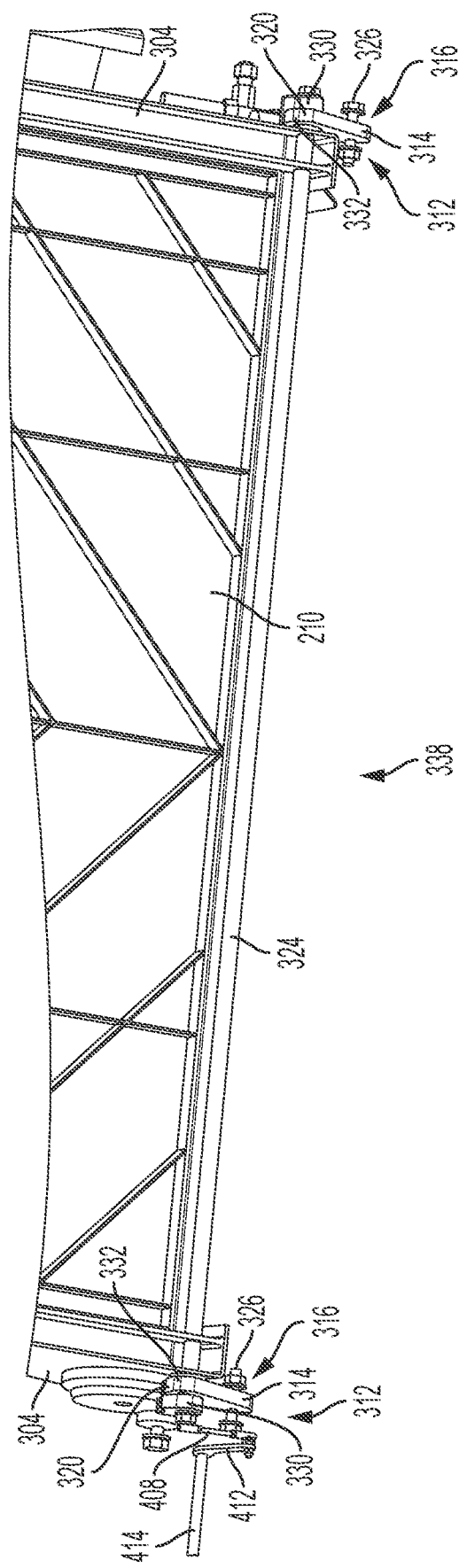
Figure 12:
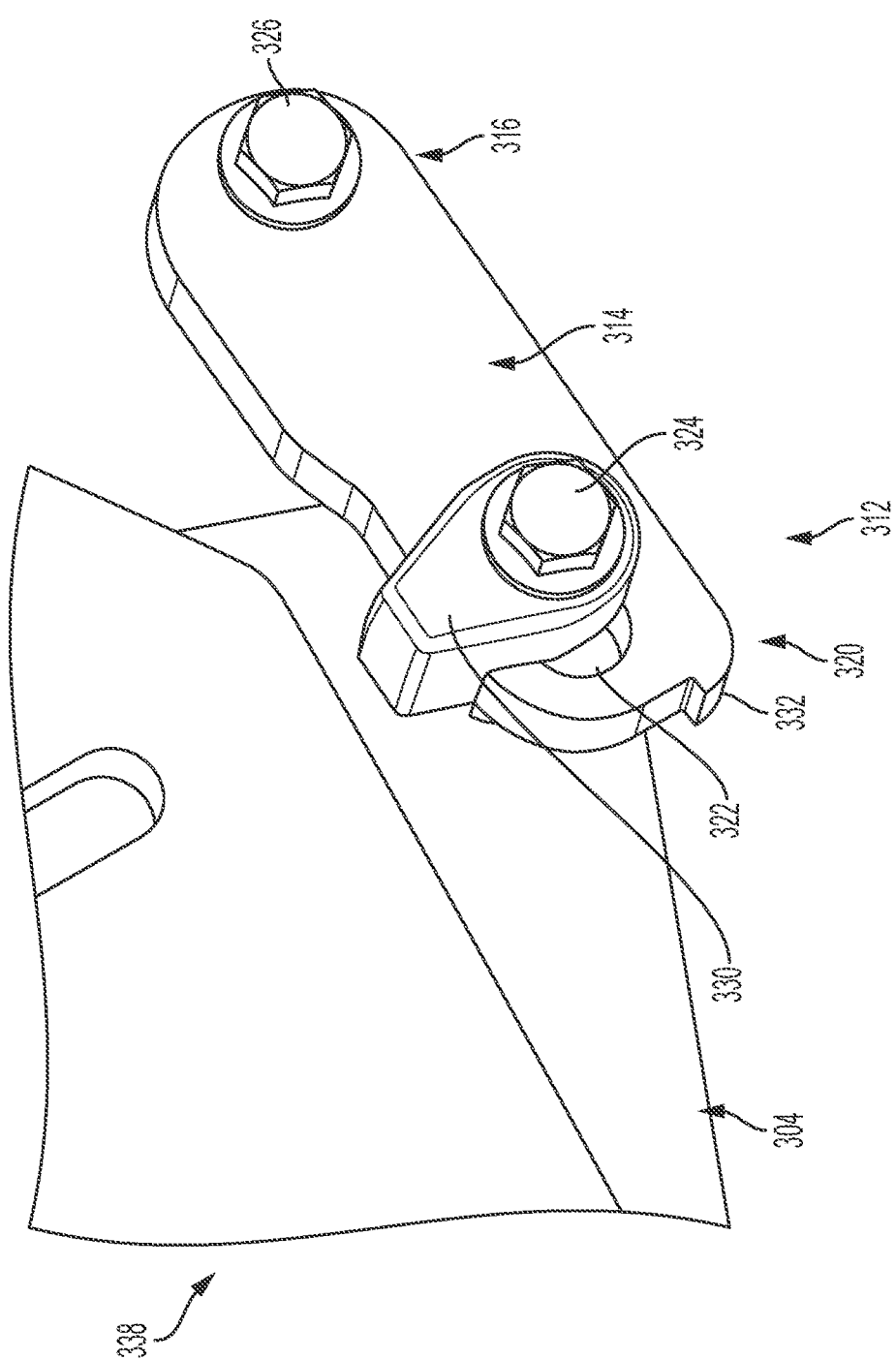

FIG. 11 is an isometric view of a linkage between parallel lockout mechanisms on either side of an infeed section of a header according to another aspect of the subject application; and FIG. 12 is an isometric view of a parallel lockout mechanism on one side of an infeed of a cutterbar assembly of a header, the lockout mechanism being in a first (flex mode) position with the infeed and cutterbar assembly in a lowered position, according to another aspect of the subject application.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale.

Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth.

The term "a," as used in the specification, means "at least one."

The terms "grain," "ear," "stalk," "leaf," and "crop material" are used throughout the specification for convenience and it should be understood that these terms are not intended to be limiting. Thus, "grain" refers to the part of a crop that is harvested and separated from discardable portions of the crop material. The header of the subject disclosure is applicable to a variety of crops, including but not limited to wheat, soybeans and small grains.

The terms "debris," "material other than grain," and the like are used interchangeably.

"About" as used herein when referring to a measurable value such as an amount, a temporal duration, and the like, is meant to encompass variations of .+−0.20%, .+−0.10%, .+−0.5%, .+−0.1%, or .+−0.0.1% from the specified value, as such variations are appropriate.

"Substantially" as used herein shall mean considerable in extent, largely but not wholly that which is specified, or an appropriate variation therefrom as is acceptable within the field of art.

Throughout this disclosure, various aspects of the exemplary embodiments may be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular exemplary embodiment. In other instances, additional features and advantages may be recognized in certain embodiments that may not be present in all exemplary embodiments.

Additionally, for convenience purposes only, identical or substantially similar elements of the exemplary embodiments, such as a plurality of flex arms, may be described with reference to only one of those elements. It is appreciated therefore that the description of one element is equally applicable to the remainder of the same elements. As such, identical elements, or substantially identical elements where so indicated, will be identified, where appropriate, by the same reference numeral, and distinguished by an alphabetical letter.

Referring now to the drawings, FIGS. 1-12 illustrate exemplary embodiments of the subject disclosure.

Figure 1:
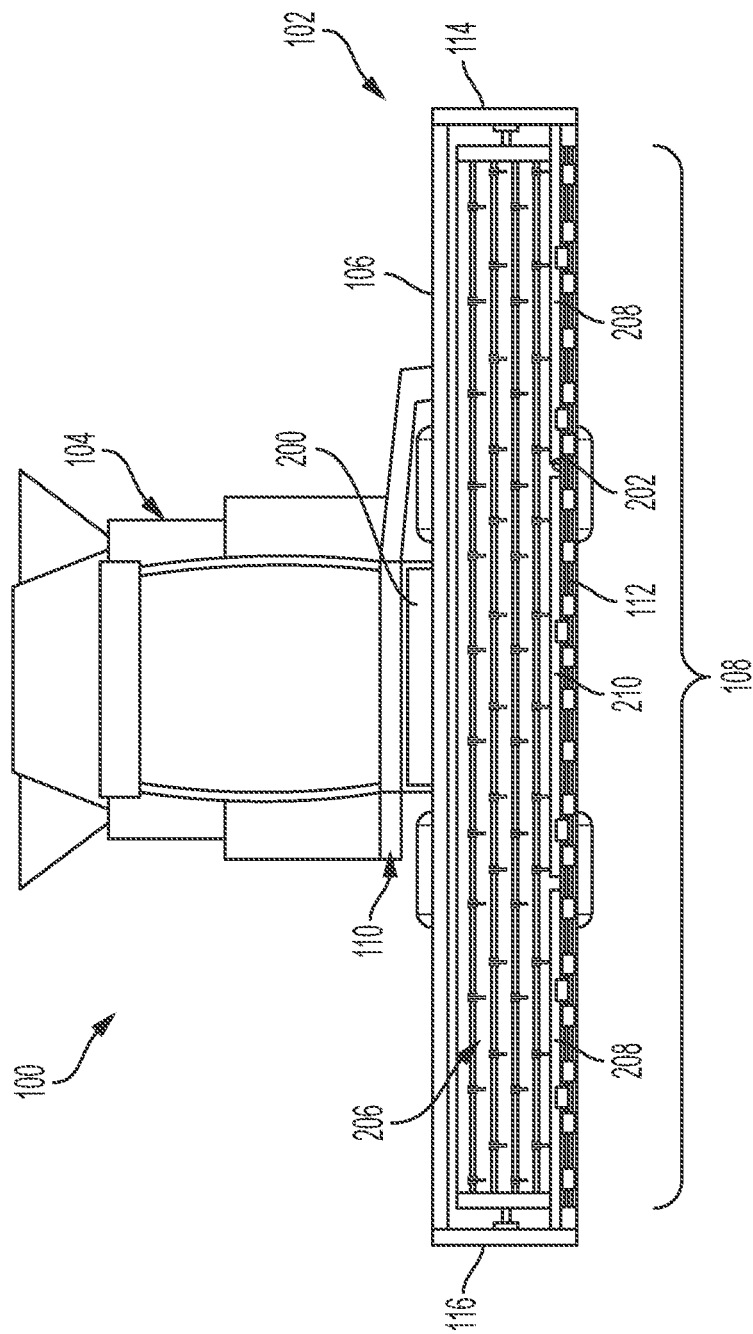
FIG. 1 is a front elevation view of an agricultural harvester including a draper header according to an aspect of the subject application.
Figure 2:
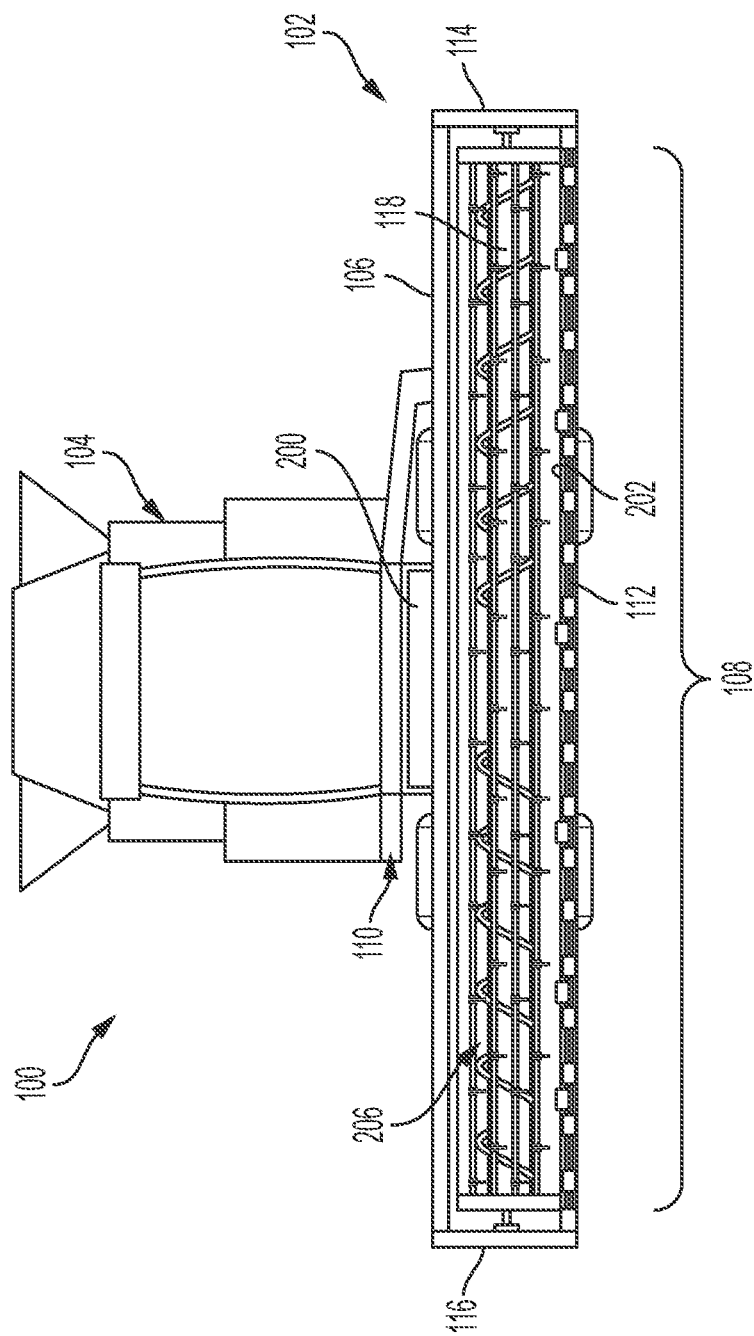
FIG. 2 is a front elevation view of an agricultural harvester including a header having an auger conveyor system according to another aspect of the subject application.

For exemplary purposes only, FIGS. 1 and 2 illustrate an agricultural harvester as a combine harvester 100. The harvester 100 comprises a header 102 and a cab 104 for an operator of the harvester. The header 102 includes a frame 106 and a cutterbar 108. The header 102 is attached to a forward end 110 of the harvester 100 and is configured to cut crops, including (without limitation) small grains (e.g., wheat, soybeans, grain, etc.), and to induct the cut crops into a feeder house 200 as harvester 100 moves forward over a crop field.

Referring now to FIG. 1 and the exemplary embodiment illustrated therein, header 102 includes a floor 202 that is supported in desired proximity to a surface of a crop field and the cutterbar 108. The cutterbar 108 of the header extends transversely along a front end 112 of the floor 202, i.e., in a widthwise direction of the harvester 100, and is bound by a first side edge 114 and an opposing second side edge 116, which are both adjacent to the floor 202. An elongated and rotatable harvesting reel assembly 206 extends above and in close proximity to the cutterbar 108. The harvesting reel assembly is configured to cooperate with a plurality of draper belts, such as lateral draper belts 208 and an infeed draper belt 210, for conveying cut crops to the feeder house 200.

The cutterbar 108 is configured to cut crops in preparation for induction into the feeder house 200. It is appreciated that the cutterbar includes one or more reciprocating sickles or knives. The reciprocating mechanisms of such knife assemblies are known in the art and a further detailed description of their structure, function and operation is not necessary for a complete understanding of the subject application. However, a typical reciprocating mechanism applicable to the knife assembly of the subject application is disclosed in U.S. Pat. No. 8,151,547, the entire disclosure of which is incorporated by reference herein.

Referring now to FIG. 2 and the exemplary embodiment illustrated therein, header 102 may include in the place of draper belts 208, 210 as shown in FIG. 1 an elongate, rotatable auger 118 that extends in close proximity to a top surface 120 of floor 202. Auger 118 is configured to cooperate with harvesting reel 206 in conveying cut crops to feeder house 200, which are configured to convey the cut crops into harvester 100 for threshing and cleaning. While FIG. 2 illustrates a header including an auger conveyor system, it will be understood that the header may alternatively be configured to include a draper conveyor system as illustrated in FIG. 1 or any combination of auger, draper or other conveyor system that may be suitable for conveying cut crop material to feeder house 200.

FIGS. 3-12 illustrate various partial views of an agricultural harvester header 112 having a lockout mechanism according to the subject application. In particular, header 112 includes a header main frame 300 and a cutterbar assembly 302 extending from the header main frame. The cutterbar assembly 302 includes a cutterbar 108 (not shown) and a plurality of flex arms or supporting arms 304 positioned laterally on either side of infeed 338. In the draper-type header illustrated in FIG. 1, infeed 338 forms a center section of the cutterbar assembly 302 and is supported on either side by flex arms 304 as illustrated in FIG. 11. In the auger-type header illustrated in FIG. 2, the cutterbar assembly 302 lacks the center infeed section 338 of the draper-type header in FIG. 1 and is supported across its entire width by a plurality of similar flex arms. For convenience the lockout mechanism of the invention is illustrated in the Figures as applied to an infeed section of a draper-type harvester header as illustrated in FIG. 1, but as would be apparent to the skilled person, the lockout mechanism of the invention can be adapted with no change to the remaining "standard" flex arms positioned laterally of the infeed section of the draper-type header in FIG. 1, as well as to the "standard" flex arms found on a auger-type header as illustrated in FIG. 2.

Figure 3:
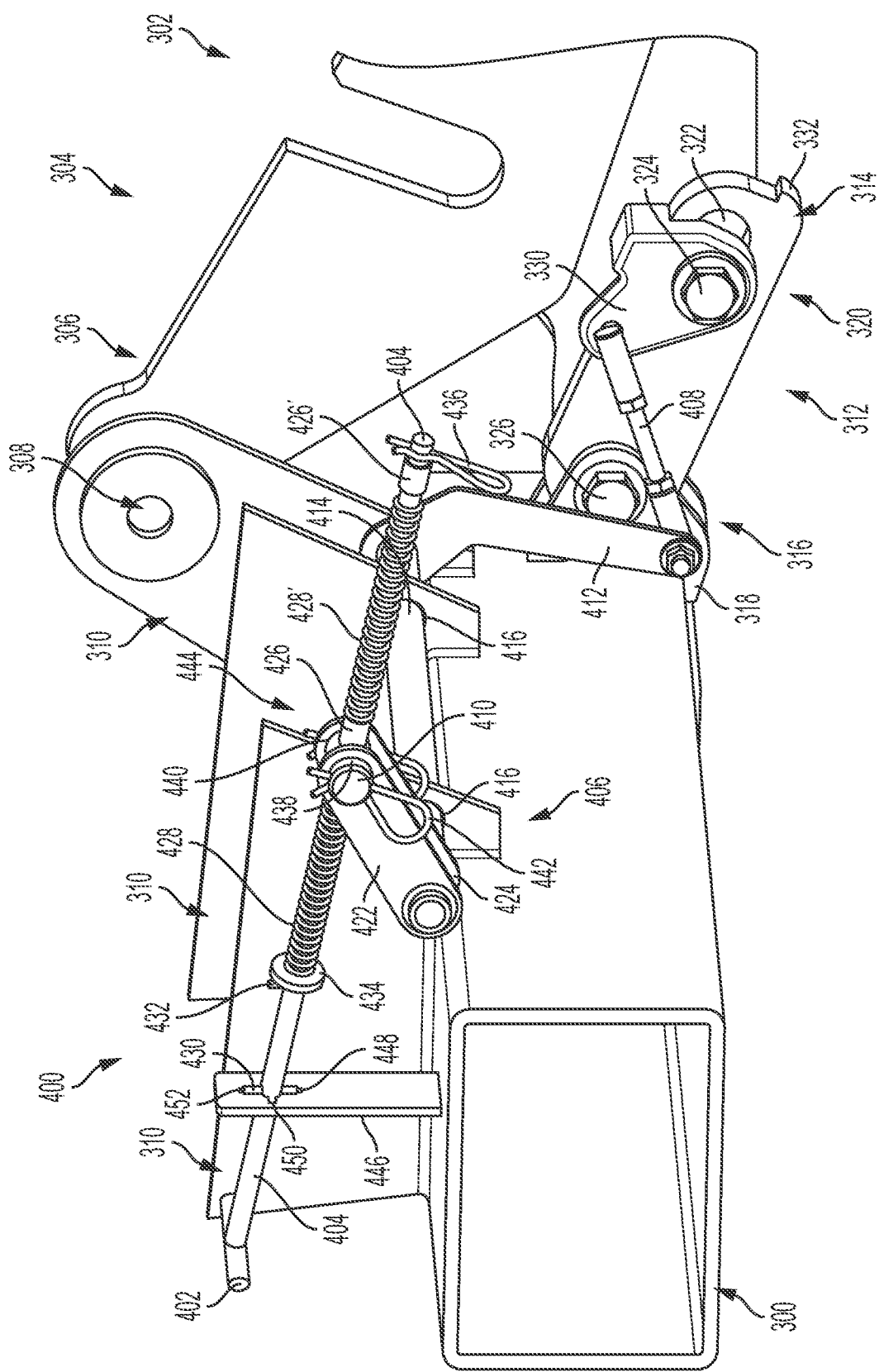
FIG. 3 is an isometric view of a header main frame and a cutterbar lockout adjustment mechanism in a first (flex mode) position with the flex arm and cutterbar in a lowered position according to an aspect of the subject application.

Each flex arm has a proximal end 306 pivotably connected to the header main frame at pivot 308 on flex arm pivot plate or frame mount 310 and an opposite, distal end (not shown) connected to the cutterbar. Header 112 further includes a lockout linkage assembly 312 that connects the flex arm 304 to the header main frame 300 at the proximal end 306 of the flex arm 304 below the flex arm pivot 308. The lockout linkage assembly 312 controls movement of the flex arm 304, and thus the cutterbar 108, relative to the header main frame 300. More particularly, the lockout linkage assembly 312 cooperates with the frame 300 and cutterbar assembly 302 to define a range of angular movement of the cutterbar assembly 302 and a range of generally perpendicular movement of the cutterbar 108 between a lowered position and a raised position The lockout linkage assembly 312 includes a lockout plate 314 formed e.g., as an elongated body or link. The lockout plate has one end connected to one of the header main frame 300 and the flex arm 304 and an opposite end pivotably and slidably connected to the other of the header main frame and the flex arm. For example, as shown in FIG. 3, the lockout plate 314 has a proximal end 316 pivotably connected to the header main frame 300 by boss or bolt or stud or rod or shaft 326 at lockout plate frame pivot 318 affixed to frame 300 and a slotted distal end 320 opposite the first end pivotably and slidably connected to the flex arm 304 via a slot 322 within which is received a boss or bolt or stud or rod or shaft 324 carried by flex arm 304 for guiding the motion of the lockout linkage assembly as the cutterbar assembly moves between raised and lowered positions around pivot 308. Alternately, lockout plate 314 could be formed such that its distal end 320 is provided with a bore for pivotable attachment to the flex arm 304 and its proximal end 316 is provided with a slot for slidable connection to the frame 300. In a further alternative, both ends of the lockout plate are provided with bores for respective pivotable attachment to the flex arm and frame, and the frame is provided with a slot through which the boss or bolt or stud or rod or shaft on the proximal end of the lockout plate slidably connects the lockout plate to the frame.

Figure 5:
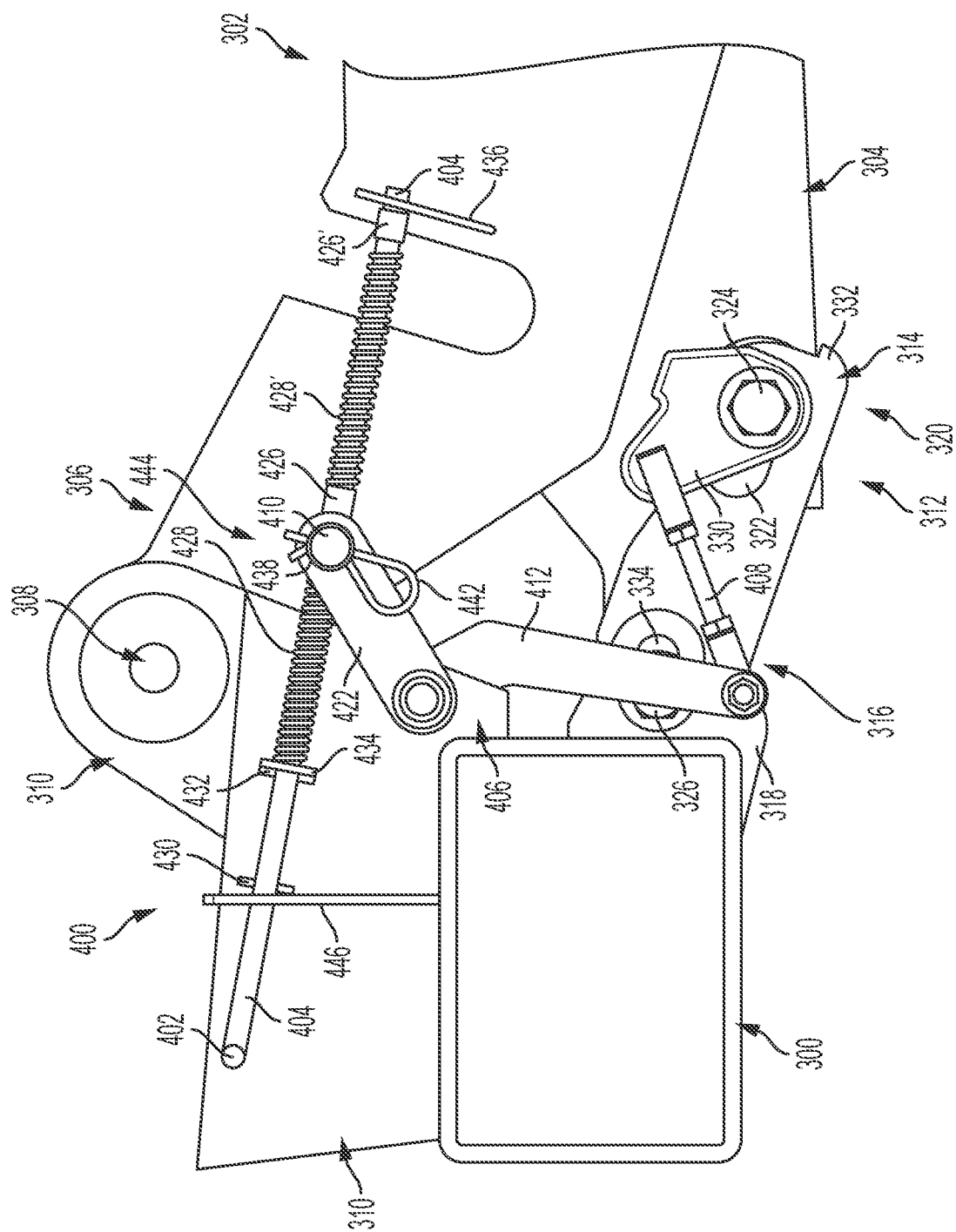
FIG. 5 is a side elevation view of a header main frame and a cutterbar lockout adjustment mechanism in the first (flex mode) position with the flex arm and cutterbar in a raised position according to another aspect of the subject application.
Figure 6:
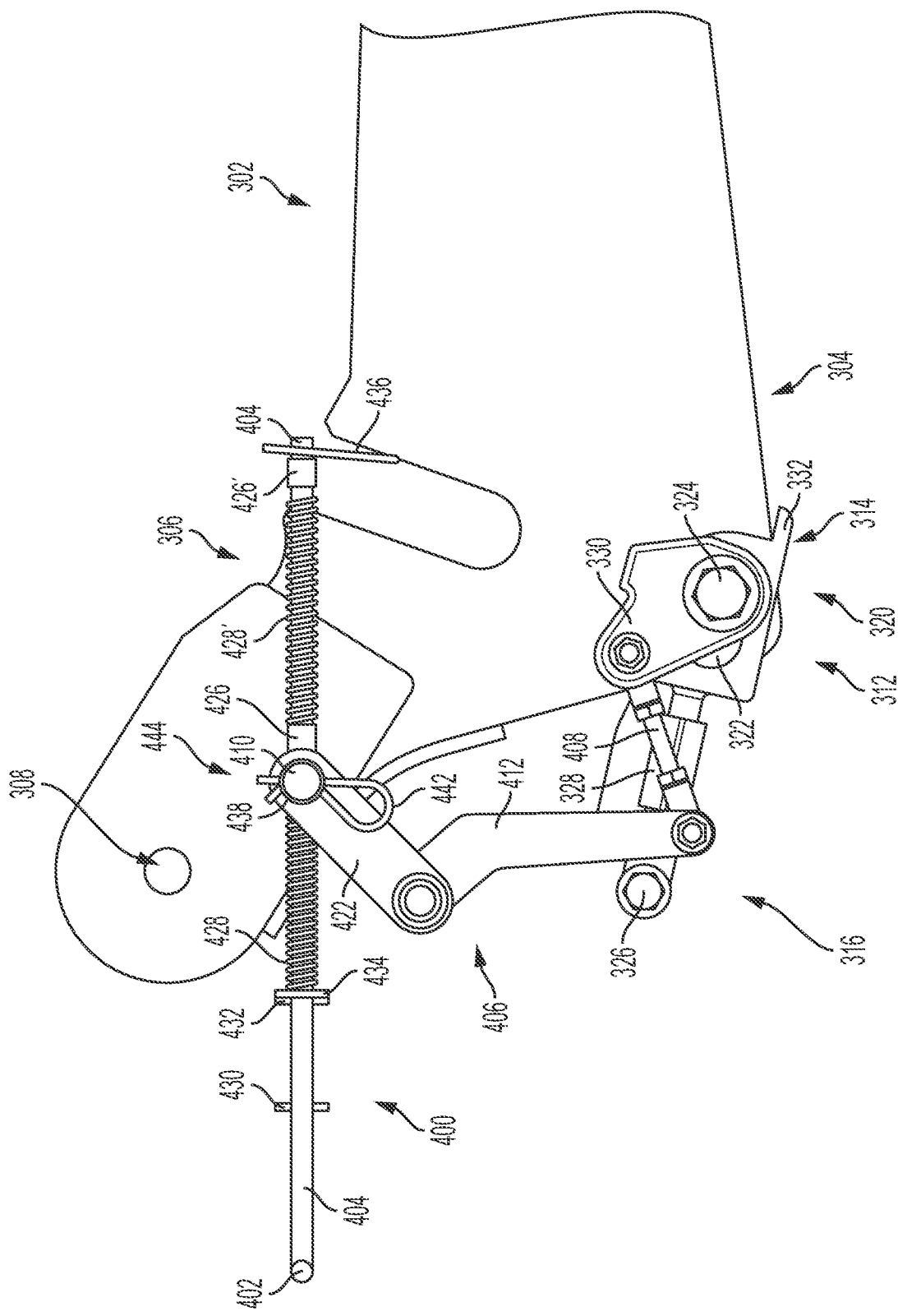
FIG. 6 is a side elevation view of a header main frame and a cutterbar lockout adjustment mechanism in the first (flex mode) position according to another aspect of the subject application.
Figure 7:
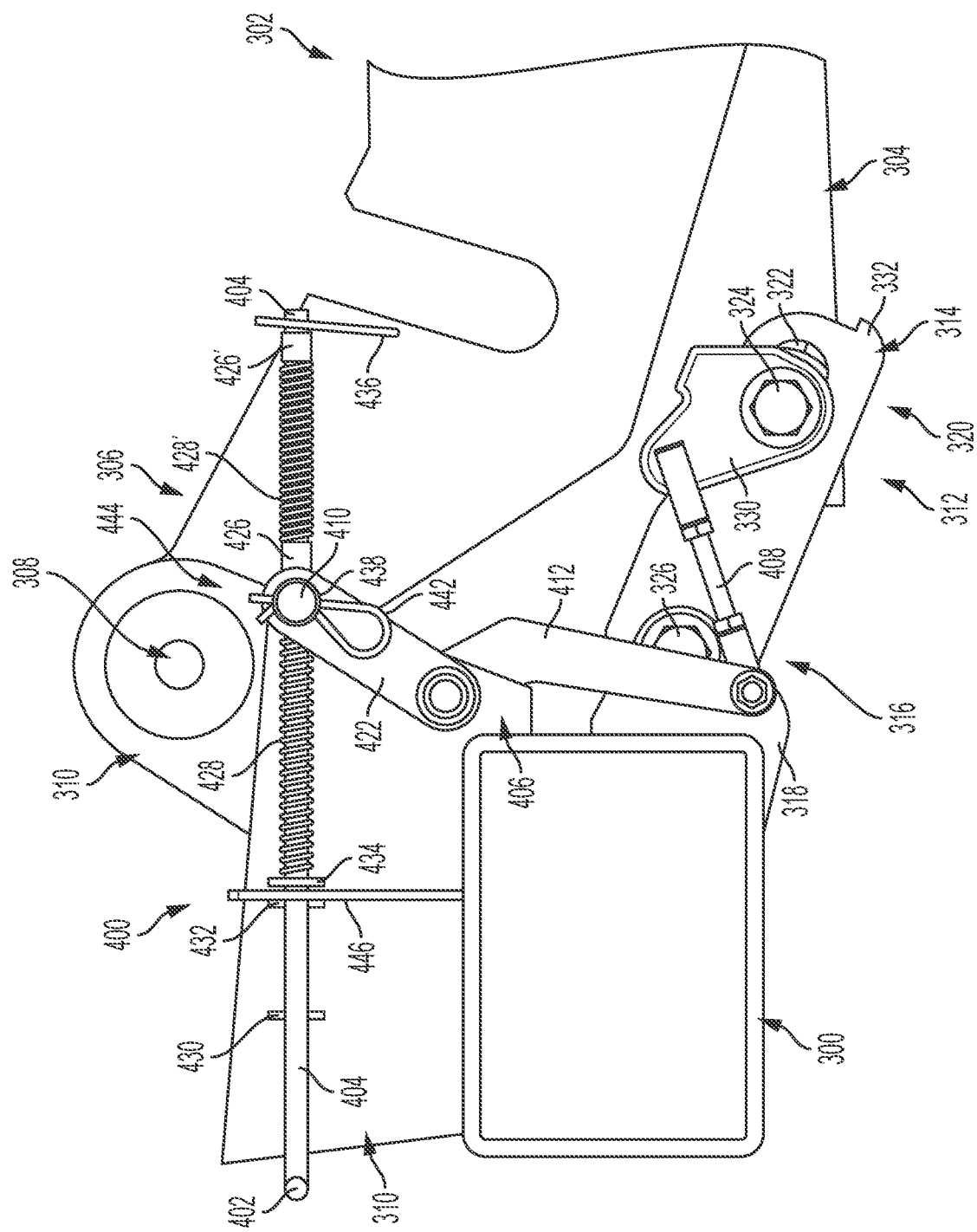
FIG. 7 is a side elevation view of a header main frame and a cutterbar lockout adjustment mechanism in the second (rigid mode) position with the flex arm and cutterbar in a lowered position according to an aspect of the subject application.
Figure 8:
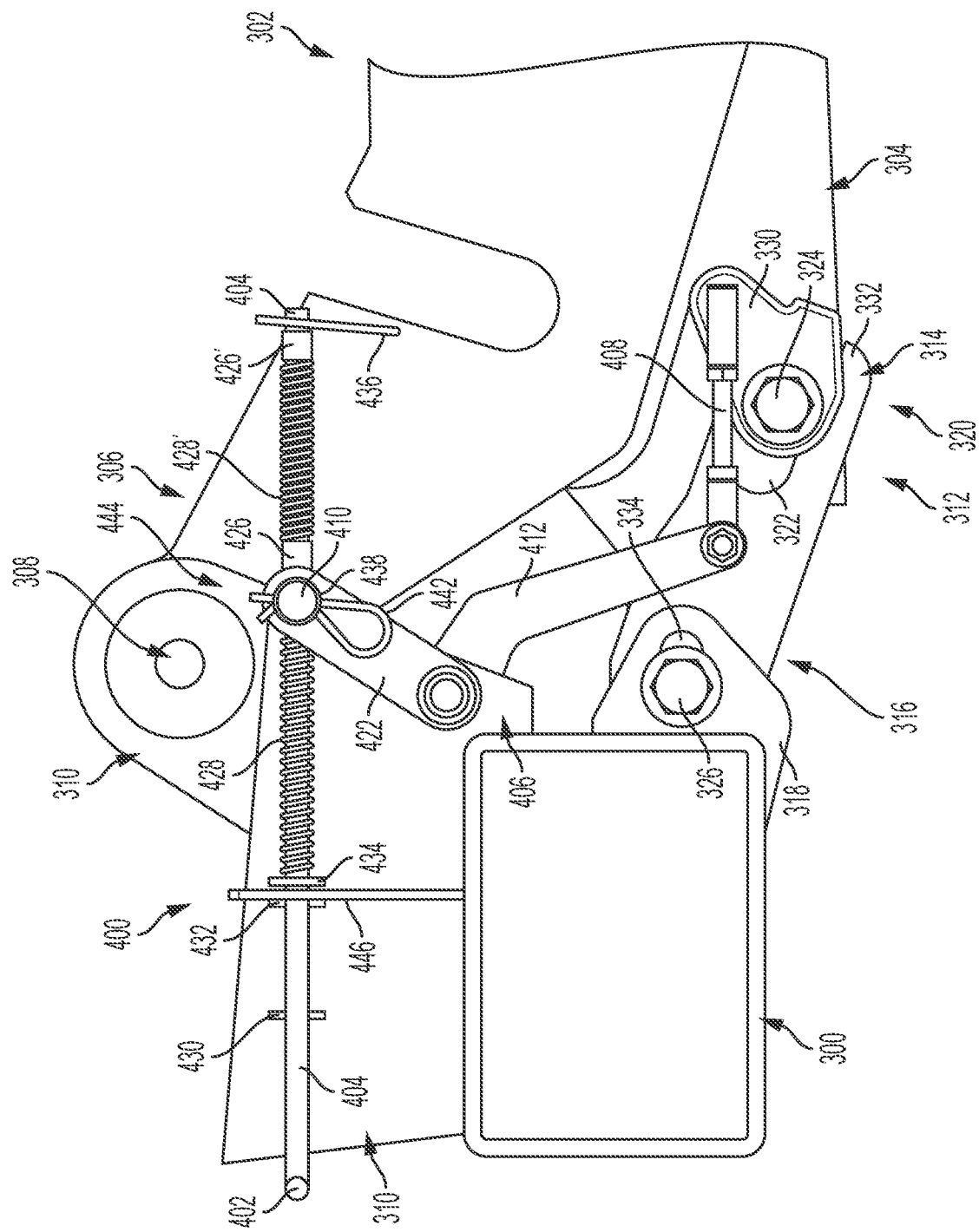
FIG. 8 is a side elevation view of a header main frame and a cutterbar lockout adjustment mechanism in a third (rigid mode) position with the flex arm and cutterbar in a raised position according to an aspect of the subject application.

As illustrated in FIGS. 5, 7, and 8, the lockout plate frame pivot 318 may also be provided with a slot 334 to receive boss or bolt or stud or rod or shaft 326 to adjust the lockout linkage assembly 312 to ensure correct engagement of the lockout cam 330 with the latch cam stop 332 at the distal end 320 of lockout plate 314. In an alternative embodiment illustrated in FIG. 6, the proximal end 316 of the lockout plate 314 may be provided with an adjustment link 328 to adjust the length of the lockout plate 314 for ensuring correct engagement of the lockout cam 330 with the latch cam stop 332 at the distal end 320 of lockout plate 314. The lockout cam 330 pivots around boss or stud or bolt or rod or shaft 324 to engage latch cam stop 332 when flex arm 304 is in the raised position. In this position, illustrated specifically in FIGS. 8 and 9, movement of the boss or stud or bolt or rod or shaft 324 in the slot 322 is restrained by the lockout cam 330 engaging latch cam stop 332, and flex arm 304 is locked in a raised position. In accordance with the alternative embodiments described in the preceding paragraph, wherein the proximal end of the lockout plate is provided with sliding attachment to the frame, the lockout cam and latch cam stop can be located at the proximal end of the lockout plate rather than at the distal end as illustrated in the Figures.

Lockout cam 330 is actuated by adjustment mechanism 400 disposed on the rear side of the header 102 facing cab 104. Adjustment mechanism 400 includes a shaft 404 having an adjustment handle 402 at its proximal end facing cab 104. Shaft 404 extends distally from handle 402 toward the front of the header 102 and connects pivotably at its distal end with linkage arm assembly 406, which is pivotably fixed to the header main frame 300. In an alternative embodiment, the linkage arm assembly can be pivotably fixed to the flex arm 304 or infeed 338. Proceeding distally along shaft 404 from handle 402, shaft 404 is provided with a first projection in the form of dowel pin 430 and spaced distally from first dowel pin 430 a second projection in the form of second dowel pin 432. Dowel pins 430 and 432 are fixed in holes (not shown) through shaft 404 substantially perpendicular to the longitudinal axis of shaft 404 and protrude on either side of the shaft diameter. Shaft 404 is pivotably connected at its distal end to linkage arm assembly 406 by clevis pin 410.

Between the second dowel pin 432 and the clevis pin 410, the shaft passes first through a washer 434 that faces the distal side of the second dowel pin 432 and then a first compression spring 428 held between the washer 434 and clevis pin 410. Distally from spring 428 shaft 404 passes through an opening (not shown) in clevis pin 410 and extends beyond the clevis pin to R-pin 436, passing through bushings 426, 426' and second compression spring 428', which is held in place on the distal side of clevis pin 410 by R-pin 436. In this arrangement, shaft 404 may rotate around its longitudinal axis freely within and slide through the opening in clevis pin 410 in a distal direction when spring 428 is compressed between washer 434 and clevis pin 410 and in a proximal direction when spring 428' is compressed between R-pin 436 and clevis pin 410. Other suitable and equivalent mechanisms for connecting the shaft 404 to the clevis pin 410, such as cotter pins, E-clips, etc., are known to those of ordinary skill and may be employed for that purpose with equal facility to the R-pin 436 specifically illustrated in the drawing figures. Such connecting mechanisms are well-known in the art and do not necessitate extensive discussion for purposes of this disclosure.

Linkage arm assembly 406 includes shaft 414, dog leg 412, and parallel linkage plates 422, 424, which together form a crank to translate axial displacement of shaft 404 into pivoting motion of lockout cam 330 around boss or stud or bolt or rod or shaft 324 and to engage or disengage lockout cam 330 with the latch cam stop 332. Linkage arm assembly 406 connects to shaft 404 via clevis pin 410, which passes though and protrudes from openings 438, 440 at one end of each of parallel linkage plates 422, 424 and is held in place by R-pins 442 and 444 on each protruding end of clevis pin 410. As will be appreciated by those of skill in the art, other suitable and functionally equivalent mechanisms for connecting the shaft 404 to the linkage arm assembly 406 are known to those of ordinary skill and may be employed for that purpose with equal facility to the clevis pin 410 and R-pins 442, 444 specifically illustrated in the drawing figures. Such connecting mechanisms are well-known in the art and do not necessitate extensive discussion for purposes of this disclosure.

At their opposite ends, parallel linkage plates 422, 424 are fixed to one end of shaft 414, forming one arm of the crank formed by the linkage arm assembly 406. Shaft 414 forms the axle of the crank mechanism formed by the linkage arm assembly 406 and is fixed at its opposite end to one end of dog leg 412, which forms the second arm of the crank formed by the linkage arm assembly 406. The other end of dog leg 412 is linked to lockout cam 330 by adjustment link 408, which is connected pivotably at one end to dog leg 412 and pivotably at its other end to the lockout cam 330. Shaft 414 is retained to header main frame 300 by passing through openings 416 in flex arm pivot plate or frame mount 310 sized and shaped to receive shaft 414 such that shaft 414 can rotate freely about its longitudinal axis within the openings. In an alternative embodiment illustrated in FIG. 10, shaft 414 is retained to the header main frame 300 by capture plate 420 in slot 418 sized and shaped to receive shaft 414. Other suitable and equivalent mechanisms for rotatably retaining the shaft 414 to the header main frame 300, or in the alternative to the flex arm 304 or infeed 338, such as bearings, fasteners, hangers, bushings, etc., are known to those of ordinary skill and may be employed for that purpose with equal facility to the openings 416 or the slot 418 and capture plate 420 specifically illustrated in the drawing figures. Such retaining mechanisms are well-known in the art and do not necessitate extensive discussion for purposes of this disclosure.

Fixed to header main frame 300 is a catch in the form of latch plate 446 having opening 448 through which shaft 404 passes. In an alternative embodiment wherein the linkage arm assembly 406 is pivotably attached not to the frame 300 but to the flex arm 304 or infeed 338, latch plate 446 may be fixed to the flex arm 304 or infeed 338 and not the frame 300. Shaft 404 passes through the latch plate generally in the section along its length bounded approximately by the locations of the of the first and second dowel pins 430, 432. Latch plate opening 448 is formed such that dowel pins 430, 432 may pass through opening 448 only when correctly oriented in a position relative to the opening 448. For example, as illustrated in an exemplary embodiment in FIGS. 3 and 10, latch plate opening 448 may take the form of a cross having a horizontal slot 450 sized to pass dowel pins 430, 432 only when the pins are aligned with slot 450. In the exemplary embodiment illustrated in FIGS. 3 and 10, latch plate opening 448 also includes a vertical slot that can partially receive but not pass dowel pins 430, 432. Latch plate opening 448 generally is formed such that a locking element on the shaft 404, such as dowel pins 430, 432 as illustrated in the figures, may selectively pass through the opening 448 when oriented in one direction but be blocked from passing through the opening 448 when oriented in a different direction by axial rotation of shaft 404.

The adjustment mechanism 400 including linkage arm assembly 406 enables an operator to set the mode of the cutterbar operation to flex or rigid independent of the position of the cutterbar, i.e. whether the cutterbar is in a raised or lowered positions. The several modes of cutterbar operation enabled by the adjustment mechanism 400 according to an embodiment of an invention will now be described with reference to the drawing figures.

Figure 4:
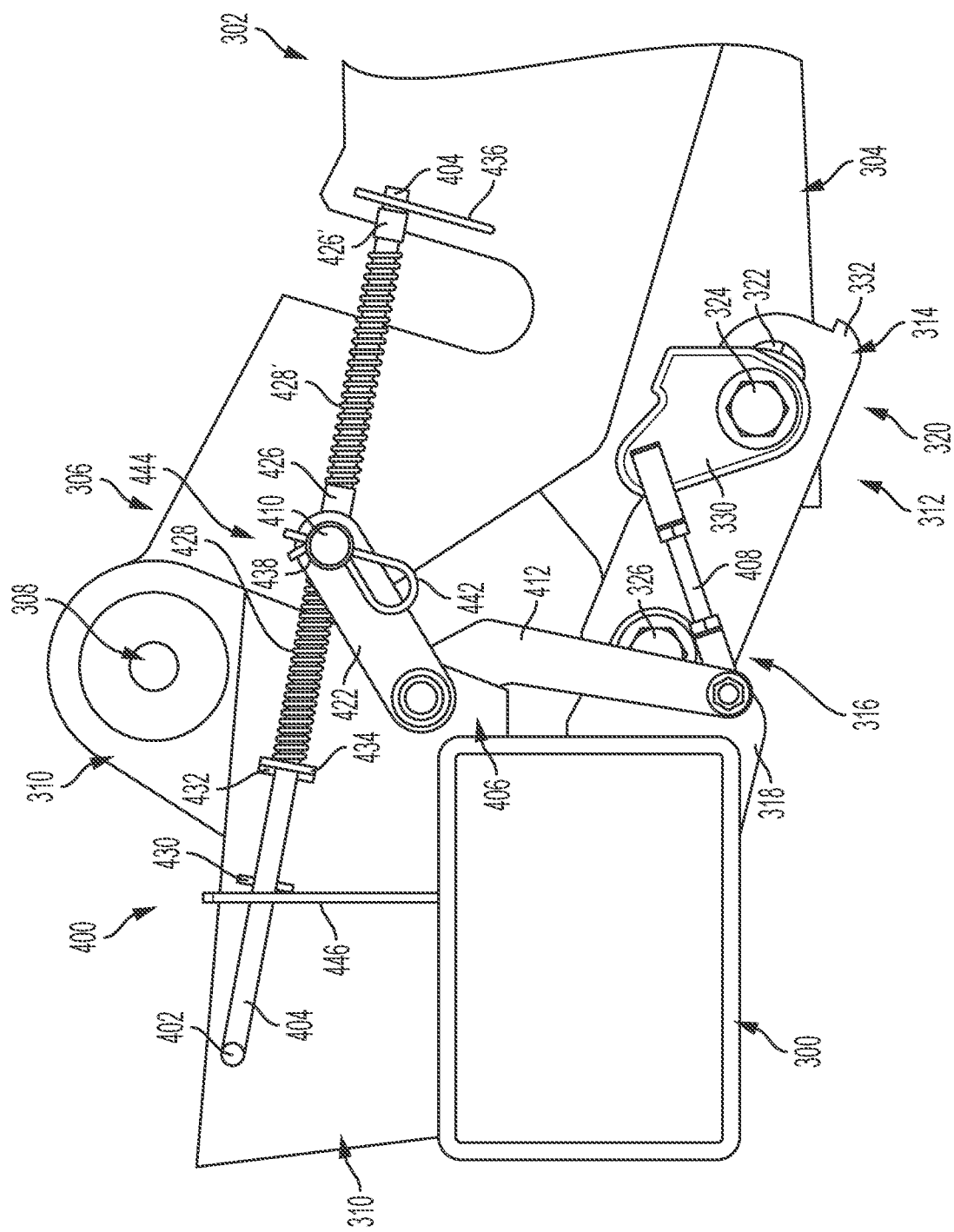
FIG. 4 is a side elevation view of a header main frame and a cutterbar lockout adjustment mechanism in the first (flex mode) position with the flex arm and cutterbar in a lowered position according to an aspect of the subject application.
Figure 10:
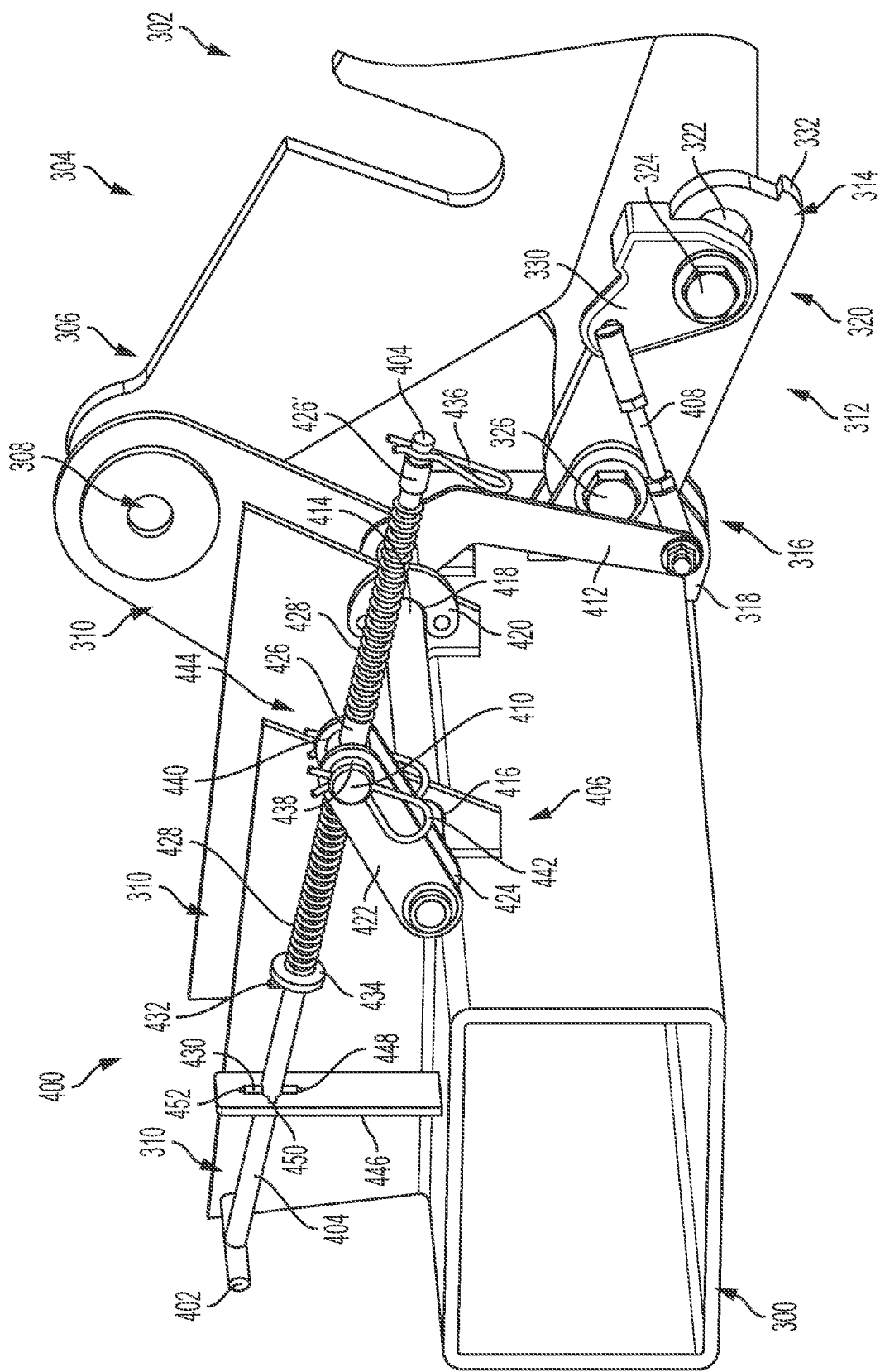
FIG. 10 is an isometric view of a header main frame and a cutterbar lockout adjustment mechanism in the first (flex mode) position with the flex arm and cutterbar assembly in a lowered position according to another aspect of the subject application.

Referring now to FIGS. 3, 4, and 10, adjustment mechanism 400 according to an embodiment of the invention is shown in flex mode with the cutterbar assembly 302 in the lowered position. In this mode, the adjustment handle 402 has been pushed forward away from the cab 104 and rotated ninety degrees, such that the first dowel pin 430 has passed through the opening 448 in latch plate 446 and is retained on the distal side of the latch plate 446. Movement of the handle 402 and shaft 404 in the direction away from the cab also forces second dowel pin 432 against washer 434, compressing spring 428 between washer 434 and clevis pin 410 as shaft 404 slides distally through the opening (not shown) in clevis pin 410. The compression of spring 428 forces first dowel pin 430 in a proximal direction into contact with the distal side of latch plate 446, where it is received partially and held in vertical position within vertical slot 452. Forward movement of the adjustment handle to lock first dowel pin 430 on the distal side of latch plate 446 also rotates lockout cam 330 rearward and out of engagement with latch cam stop 332. With the lockout cam 330 rotated out of engagement with latch cam stop 332, boss or stud 324 may slide freely within slot 322, allowing cutterbar assembly 302 to flex up into a raised position (as shown in FIGS. 5 and 6) or down into the lowered position (as shown in FIGS. 3, 4, and 10), within the limits defined by the travel of boss or stud 324 within slot 322.

Referring now to FIGS. 5 and 6, adjustment mechanism 400 according to an embodiment of the invention is shown in flex mode with the cutterbar assembly 302 in the raised position. In this mode, the position of the adjustment mechanism 400 and all related elements is unchanged from the position depicted in FIGS. 3, 4, and 10. However, the cutterbar assembly 302 has been moved to the raised position, and the boss or stud 326 is now positioned in the far forward end of slot 322. With lockout cam 330 rotated out of engagement with the latch cam stop 332, cutterbar assembly 302 can move or flex between raised and lowered positions within the limits defined by the travel of boss or stud 326 within slot 322, uninhibited by the lockout mechanism.

Referring now to FIG. 7, adjustment mechanism 400 according to an embodiment of the invention is shown in rigid or lockout mode with the cutterbar assembly 302 in the lowered position. In this mode, the adjustment handle 402 has been pulled rearward toward the cab 104 and rotated ninety degrees, such that the second dowel pin 432 has passed through the opening 448 in latch plate 446 and is retained by latch plate 446 on its proximal side facing cab 104. Movement of the second dowel pin 432 to the proximal side of latch plate 446 also compresses spring 428' between bushing 426 and clevis pin 410 proximally and bushing 426' and R-pin 436 distally. The compression of spring 428' forces second dowel pin 432 into contact with the proximal side of latch plate 446, where it is received partially and held in vertical position within vertical slot 452. Locking second dowel pin 432 on the proximal side of latch plate 446 also applies a forward rotating force to lockout cam 330, but with the cutterbar assembly 302 in the lowered position, forward rotation of the lockout cam 330 around boss or stud 324 is blocked by the top edge of lockout plate 314, and so long as the cutterbar assembly remains in the lowered position, lockout cam 330 cannot engage latch cam stop 332. Nevertheless, with the adjustment mechanism fixed in this rigid or lockout mode, lockout cam 330 is preloaded by the compression of spring 428' to rotate forward and engage latch cam stop 332 when cutterbar assembly 302 is moved into the raised position.

Figure 9:
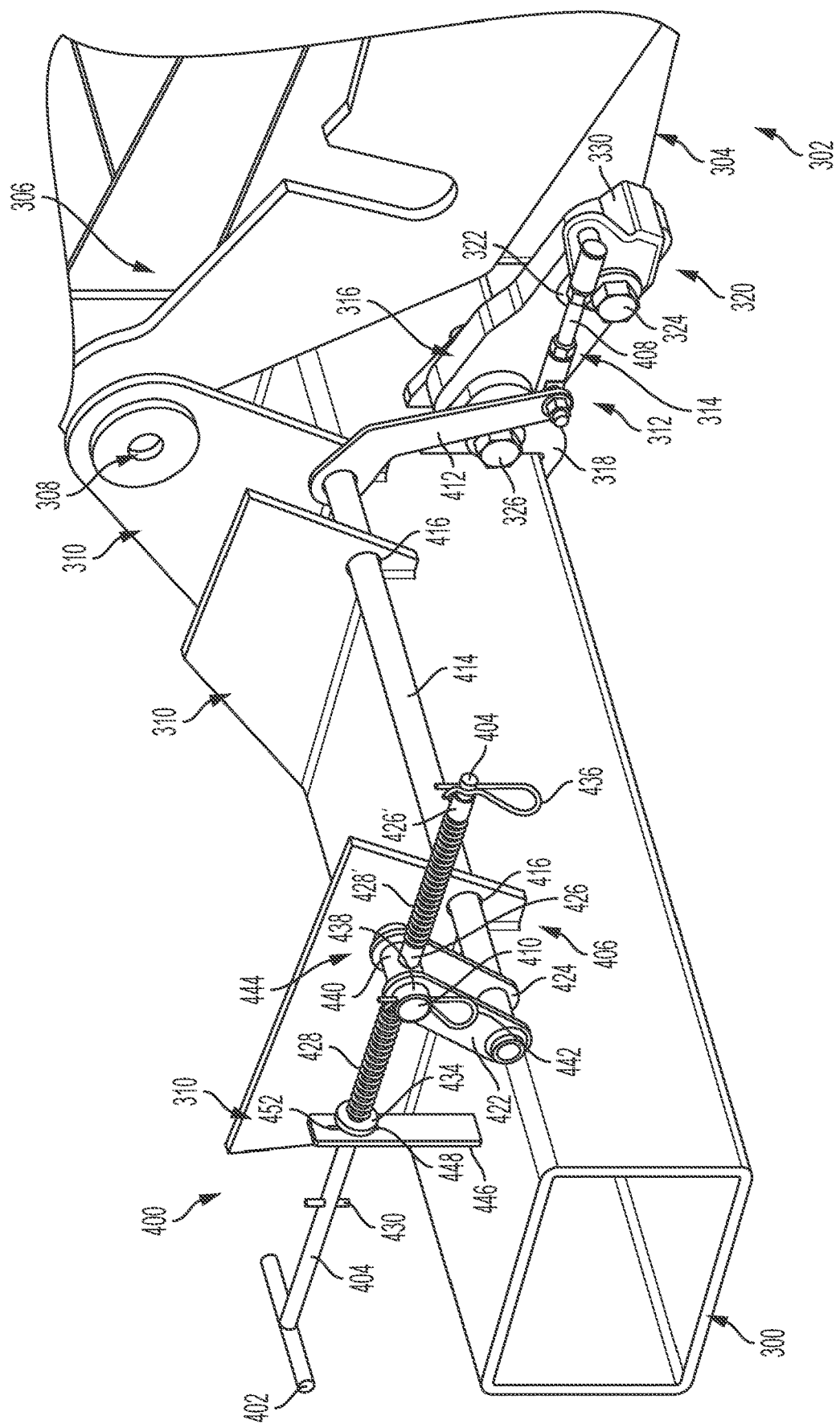
FIG. 9 is an isometric view of a header main frame and a cutterbar lockout adjustment mechanism in the third (rigid mode) position with the flex arm and cutterbar in a raised position according to an aspect of the subject application.

Referring now to FIGS. 8 and 9, adjustment mechanism 400 according to an embodiment of the invention is shown in rigid or lockout mode with the cutterbar assembly 302 in the raised position. In this mode, boss or stud 326 is positioned in the far forward end of slot 322, and lockout cam 330 has been rotated forward by spring 428' into engagement with the latch cam stop 332. Engagement of cam 330 with latch cam stop 332 locks boss or stud 326 into the forward end of slot 332, fixing cutterbar assembly 302 in the raised position. Cutterbar assembly 302 is released from this raised, locked position by moving the adjustment mechanism 400 into flex mode as shown in FIGS. 5 and 6.

Referring now to FIG. 11, a preferred embodiment of adjustment mechanism 400 according to an aspect of the present application is illustrated. Lockout linkage assemblies 312 positioned on either side of infeed 338 are linked by boss or stud 326 and operate in parallel to provide lockout control to flex arms 304 supporting infeed 338. One lockout linkage assembly 312 is connected via adjustment link 408 to and controlled by adjustment mechanism 400. The opposite lockout linkage 312 is actuated in parallel through boss or stud 326. FIG. 12 is a detail of the opposite lockout linkage 312, showing lockout cam 330 disengaged from latch cam stop 334 with flex arm 304 in the raised position.

The header and cutterbar adjustment mechanism of the subject application greatly reduce the effort and danger associated with placing a cutterbar assembly into a locked position relative to a header main frame. The adjustment mechanism is brought to the back of the header to provide easy access for the operator. At the same time, the need for the operator to crawl underneath the header to lift and lock the cutterbar assemblies is eliminated. Most advantageously, the adjustment mechanism can be switched between rigid and flex modes regardless of the cutterbar position.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A header for an agricultural harvester, comprising:
a frame;
a cutterbar assembly comprising a flex arm and a cutterbar connected to the flex arm at a distal end of the flex arm, the cutterbar assembly connected to the frame by a pivot located at a proximal end of the flex arm;
a lockout linkage assembly further connecting the frame to the proximal end of the flex arm, wherein the lockout linkage assembly cooperates with the frame and cutterbar assembly to define a range of angular movement of the cutterbar assembly and a range of generally perpendicular movement of the cutterbar between a lowered position and a raised position; and
a cutterbar lockout adjustment mechanism having a flex mode wherein the cutterbar assembly moves freely between the lowered position and the raised position and a rigid mode wherein the cutterbar assembly is locked in the raised position, wherein the cutterbar lockout adjustment mechanism is configured to be set in the flex mode or the rigid mode independent of the position of the cutterbar assembly,
wherein the lockout linkage assembly comprises a link having a first end, a second end, and an elongated aperture adjacent the second end, wherein the first end is pivotably connected to one of the frame and the cutterbar assembly and the second end is slidably connected to the other of the frame and the cutterbar assembly.

2. The header of claim 1, wherein the link comprises an elongated plate and the elongated aperture comprises a slot adjacent the second end.

3. A header for an agricultural harvester, comprising:
a frame;
a cutterbar assembly comprising a flex arm and a cutterbar connected to the flex arm at a distal end of the flex arm, the cutterbar assembly connected to the frame by a pivot located at a proximal end of the flex arm;
a lockout linkage assembly further connecting the frame to the proximal end of the flex arm, wherein the lockout linkage assembly cooperates with the frame and cutterbar assembly to define a range of angular movement of the cutterbar assembly and a range of generally perpendicular movement of the cutterbar between a lowered position and a raised position; and
a cutterbar lockout adjustment mechanism having a flex mode wherein the cutterbar assembly moves freely between the lowered position and the raised position and a rigid mode wherein the cutterbar assembly is locked in the raised position, wherein the cutterbar lockout adjustment mechanism is configured to be set in the flex mode or the rigid mode independent of the position of the cutterbar assembly,
wherein the cutterbar lockout adjustment mechanism is connected to a latch cam pivotably attached to the cutterbar assembly.

4. The header of claim 3, wherein the latch cam is configured to engage a stop on the lockout linkage assembly to lock the cutterbar assembly in the raised position only with the cutterbar assembly in the raised position.

5. The header of claim 4, wherein the cutterbar lockout adjustment mechanism comprises a handle extending toward a proximal side of the frame, wherein the handle sets the position of the cutterbar lockout adjustment mechanism into the flex or rigid mode.

6. The header of claim 5, wherein a linkage arm assembly connects the handle to the latch cam.

7. The header of claim 5, wherein the handle is set by resiliently retaining a projection on the handle to a catch.

8. A method of setting operating modes of a header for an agricultural harvester, the header comprising a frame, a cutterbar assembly, a lockout linkage assembly, and a cutterbar lockout adjustment mechanism, the cutterbar assembly comprising a flex arm and a cutterbar connected to the flex arm at a distal end of the flex arm, the method comprising the steps of:
  connecting the cutterbar assembly to the frame via a pivot at a proximal end of the cutterbar assembly;
  connecting a proximal end of the lockout linkage assembly to the frame and connecting a distal end of the lockout linkage assembly to the proximal end of the cutterbar assembly, wherein the lockout linkage assembly cooperates with the frame and cutterbar assembly to define a range of angular movement of the cutterbar assembly and a range of generally perpendicular movement of the cutterbar between a lowered position and a raised position;
  attaching the cutterbar lockout adjustment mechanism to the header, wherein the cutterbar lockout adjustment mechanism comprises a handle extending toward a proximal side of the frame and the handle sets the position of the cutterbar lockout adjustment mechanism into a flex mode or a rigid mode;
  connecting the cutterbar lockout adjustment mechanism to a latch cam pivotably attached to the cutterbar assembly, wherein the latch cam is configured to engage a stop on the lockout linkage assembly to lock the cutterbar assembly in the raised position only with the cutterbar assembly in the raised position; and
  setting the cutterbar lockout adjustment mechanism to the flex mode wherein the cutterbar assembly moves freely between the lowered position and the raised position or to the rigid mode wherein the cutterbar assembly is locked in the raised position.

9. The method of claim 8, wherein the lockout linkage assembly comprises a link having a first end, a second end, and an elongated aperture adjacent the second end, wherein the first end is pivotably connected to one of the frame and the cutterbar assembly and the second end is slidably connected to the other of the frame and the cutterbar assembly.

10. The method of claim 9, wherein the link comprises an elongated plate and the elongated aperture comprises a slot adjacent the second end.

11. The method of claim 8, wherein a linkage arm assembly attached to the frame connects the handle to the latch cam.

12. The method of claim 8, wherein the handle is set by resiliently retaining a projection on the handle to a catch fixed to the frame.

13. A method for repositioning a cutterbar assembly of a header for an agricultural harvester, the header comprising a frame, a cutterbar assembly, a lockout linkage assembly, and a cutterbar lockout adjustment mechanism, the cutterbar assembly comprising a flex arm and a cutterbar connected to the flex arm at a distal end of the flex arm, the method comprising the steps of:
  connecting the cutterbar assembly to the frame via a pivot at a proximal end of the cutterbar assembly;
  connecting a proximal end of the lockout linkage assembly to the frame and connecting a distal end of the lockout linkage assembly to the proximal end of the cutterbar assembly, wherein the lockout linkage assembly cooperates with the frame and cutterbar assembly to define a range of angular movement of the cutterbar assembly and a range of generally perpendicular movement of the cutterbar between a lowered position and a raised position;
  attaching the cutterbar lockout adjustment mechanism to the header, wherein the cutterbar lockout adjustment mechanism comprises a handle extending toward a proximal side of the frame and the handle sets the position of the cutterbar lockout adjustment mechanism into a flex mode or a rigid mode;
  connecting the cutterbar lockout adjustment mechanism to a latch cam pivotably attached to the cutterbar assembly, wherein the latch cam is configured to engage a stop on the lockout linkage assembly to lock the cutterbar assembly in the raised position only with the cutterbar assembly in the raised position;
  setting the cutterbar lockout adjustment mechanism to the rigid mode wherein the cutterbar assembly is locked in the raised position; and
  moving the cutterbar assembly into the raised position, wherein the latch cam engages the stop to lock the cutterbar assembly in the raised position.

14. The method of claim 13, wherein the lockout linkage assembly comprises a link having a first end, a second end, and an elongated aperture adjacent the second end, wherein the first end is pivotably connected to one of the frame and the cutterbar assembly and the second end is slidably connected to the other of the frame and the cutterbar assembly.

15. The method of claim 14, wherein the link comprises an elongated plate and the elongated aperture comprises a slot adjacent the second end.

16. The method of claim 13, wherein a linkage arm assembly attached to the frame connects the handle to the latch cam.

17. The method of claim 13, wherein the handle is set by resiliently retaining a projection on the handle to a catch fixed to the frame.

* * * * *